United States Patent
Abelheira et al.

(10) Patent No.: US 10,766,622 B2
(45) Date of Patent: Sep. 8, 2020

(54) LIGHTWEIGHT VEHICLE PASSENGER SEAT ASSEMBLIES

(71) Applicant: YABORÃ INDÚSTRIA AERONÁUTICA S.A., São José dos Campos-SP (BR)

(72) Inventors: Ricardo Athayde Abelheira, São José dos Campos (BR); Flavia Renata Dantas Alves Silva Ciaccia, São José dos Campos (BR); Fábio Santos da Silva, São José dos Campos (BR); Rodrigo Takashi Lourenço Kawasaki, São Paulo (BR); Moacir Morais de Andrade Lima, São José dos Campos (BR); Fabiano Mafra Decarli, Jacareí (BR); Demetrio Andrade de Campos, São José dos Campos (BR)

(73) Assignee: YABORÃ INDÚSTRIA AERONÁUTICA S.A., São José dos Campos-SP (BR)

( * ) Notice: Subject to any disclaimer, the term of this patent is extended or adjusted under 35 U.S.C. 154(b) by 16 days.

(21) Appl. No.: 16/166,514

(22) Filed: Oct. 22, 2018

(65) Prior Publication Data

US 2019/0118951 A1     Apr. 25, 2019

Related U.S. Application Data

(60) Provisional application No. 62/575,582, filed on Oct. 23, 2017.

(51) Int. Cl.
*B64D 11/06*     (2006.01)
*A47C 7/28*     (2006.01)
(Continued)

(52) U.S. Cl.
CPC .......... *B64D 11/0647* (2014.12); *A47C 7/282* (2013.01); *B60N 2/242* (2013.01);
(Continued)

(58) Field of Classification Search
CPC ...... B60N 2/882; B60N 2/7076; B60N 2/667; B60N 2/66; A47C 7/282; A47C 7/287; B64D 11/0647; B64D 11/0648
See application file for complete search history.

(56) References Cited

U.S. PATENT DOCUMENTS 2,273,273 A * 2/1942 Samuel ................. A47C 7/282
                                                    267/112
2,362,585 A * 11/1944 Robinson ............... A47C 7/282
                                                    267/85
(Continued)

FOREIGN PATENT DOCUMENTS

DE        3204540 A1 * 8/1983 ............. B60N 2/666
DE     10012034 A1 * 9/2001 ............... A47C 5/06
(Continued)

*Primary Examiner* — Timothy J Brindley
(74) *Attorney, Agent, or Firm* — Nixon & Vanderhye P.C.

(57) ABSTRACT

Lightweight passenger seats that are especially adapted for use in aircraft cabins. The seats will include a seat back and a seat bottom having a basin which defines a recessed central interior space, a plurality of straps having opposed ends connected to respective upper edge regions of the basin so as to be positioned under tension over the recessed central interior space; and a cover cushion covering the straps and connected to the basin. The seat back may be connected at opposed sides thereof to upright support members adjacent a lumbar region thereof so as to establish an upper region of the seat back above the lumbar region which is capable of being resiliently flexed between upright and rearwardly inclined positions.

31 Claims, 9 Drawing Sheets

(51) Int. Cl.
*B60N 2/75* (2018.01)
*B60N 2/24* (2006.01)
*B60N 2/72* (2006.01)
*B60N 2/70* (2006.01)

(52) U.S. Cl.
CPC ............. *B60N 2/7076* (2013.01); *B60N 2/72* (2013.01); *B60N 2/753* (2018.02); *B64D 11/06* (2013.01); *B64D 11/064* (2014.12); *B64D 11/0642* (2014.12); *B64D 11/0649* (2014.12)

(56) References Cited

U.S. PATENT DOCUMENTS

| | | | | |
|---|---|---|---|---|
| 2,527,635 | A * | 10/1950 | Hoffman, III | A47C 7/282 297/300.1 |
| 3,088,773 | A * | 5/1963 | Horrocks | A47C 7/282 297/452.1 |
| 3,120,407 | A * | 2/1964 | Propst | A47C 31/11 297/452.19 |
| 3,751,110 | A * | 8/1973 | Shaw | A47C 5/06 297/452.63 |
| 5,485,976 | A * | 1/1996 | Creed | B64D 11/06 244/118.6 |
| 5,716,101 | A * | 2/1998 | Frinier | A47C 5/06 297/218.4 |
| 5,762,403 | A * | 6/1998 | Robinson | A47C 5/06 297/440.11 |
| 6,231,125 | B1 * | 5/2001 | Maeda | A47C 7/282 297/452.56 |
| 7,871,039 | B2 | 1/2011 | Fullerton et al. | |
| 7,954,762 | B2 | 6/2011 | Boren et al. | |
| 8,016,361 | B2 | 9/2011 | Kismarton et al. | |
| 8,020,936 | B2 | 9/2011 | Asami et al. | |
| 8,336,965 | B2 | 12/2012 | Kismarton et al. | |
| 8,596,723 | B2 | 12/2013 | Ahad | |
| 9,126,519 | B2 * | 9/2015 | Uebelacker | B60N 2/7011 |
| 9,327,835 | B2 | 5/2016 | Saada et al. | |
| 2002/0089219 | A1 * | 7/2002 | Blanco | B60N 2/4221 297/284.4 |
| 2003/0094838 | A1 * | 5/2003 | Williamson | B60N 2/682 297/232 |
| 2006/0138832 | A1 * | 6/2006 | Ogura | B60N 2/66 297/284.4 |
| 2007/0102987 | A1 * | 5/2007 | Chen | A47C 7/18 297/452.56 |
| 2008/0106136 | A1 * | 5/2008 | Heidmann | A47C 7/28 297/452.56 |
| 2017/0050547 | A1 * | 2/2017 | Dunham | B60N 2/882 |
| 2018/0215294 | A1 * | 8/2018 | Hosbach | B60N 2/6063 |

FOREIGN PATENT DOCUMENTS

| | | | | |
|---|---|---|---|---|
| DE | 102013103436 | A1 * | 10/2014 | ......... B64D 11/0636 |
| DE | 102016102707 | A1 * | 8/2017 | ......... B64D 11/0696 |
| EP | 0053012 | A1 * | 6/1982 | ......... B64D 11/0696 |
| EP | 3459852 | A1 * | 3/2019 | ............... B60N 2/77 |
| FR | 2732565 | A1 * | 10/1996 | ............. A47C 7/282 |
| FR | 2934821 | A1 * | 2/2010 | ............... B60N 2/66 |
| GB | 720696 | A * | 12/1954 | ............. A47C 7/282 |
| WO | WO-02066284 | A1 * | 8/2002 | ........... B64D 11/064 |

* cited by examiner

LIGHTWEIGHT VEHICLE PASSENGER SEAT ASSEMBLIES

CROSS-REFERENCE TO RELATED APPLICATION

This application is based on and claims domestic priority benefits from U.S. Provisional Application Ser. No. 62/575,582 filed on Oct. 23, 2017 and is related to commonly owned US Design application Ser. No. 29/623,100 filed on Oct. 23, 2017, the entire contents of each such prior filed application being expressly incorporated hereinto by reference.

FIELD

The embodiments disclosed herein relate generally to lightweight vehicle passenger seat assemblies. The passenger seat assemblies according to the embodiments disclosed herein are especially useful for aircraft having a relatively tight living space and can provide passenger comfort for short and mid-duration travel times (e.g., flight times of up to about 4 hours).

BACKGROUND

The latest design trends in aircraft cabin interiors demonstrate that providing a lightweight passenger seat that provides adequate passenger comfort is an extremely difficult balance to achieve due to sometimes competing requirements. For example, the requirement for comfort is important primarily for the passenger using the seat and the commercial airlines that are of course in the business of transporting such passengers in comfort. In this regard, airlines have explored the possibility to provide passengers with additional comfort and space at a cost to the passenger as means to increase revenue since current interior cabin seat layouts can make passengers feel cramped, especially when travelling in economy classes. The lack of privacy due to "living space" squeeze is also a common complaint from passengers as people tend recline in their seat which exacerbates the perception that the space afforded to passengers is even smaller. In extreme cases, passenger discomfort can cause flight disruptions and conflicts among passengers.

There are also weight requirements for passenger seats which must be taken into account since weight affects directly the airline business because increased weight affects either the airline's operational costs or the business model of the airline which might offer more payload for the same fare. There are also aesthetics and design requirements that must be taken into account which play an important role for the airlines and branding for the original equipment manufacturer (OEM). Airlines are constantly striving for a distinctive look in a highly competitive market.

Last but certainly not the least are safety and crashworthiness requirements, which make the implementation of new solutions and new materials a risky business endeavor since crash conditions occur in severe dynamic scenarios that are difficult to predict.

The vast majority of seat manufacturers who address these challenges fail to fulfill all the requirements in the same way, usually resulting in a poor passenger comfort experience and/or a seat that is unnecessarily heavy. The common solution to reduce seat weight is to remove padding from the cushions, therefore making the seats lighter, slimmer and thinner. That trend, however, removes value from the passenger, as resting surfaces (i.e.: seat bottoms and backrests) get harder and trap heat, causing quick muscle fatigue. Tight pitches limit movements, and cushioning surfaces get thinner and harder. Alternative materials to foam in aircraft seat for passenger comfort, and alternative materials and techniques for seat structure design are not so common to come by. Some previous literature and patents have presented solutions to this sort of challenge, usually driven by weight reduction, and addressing the technological limitations brought by manufacturing processes and materials as evidenced by U.S. Pat. Nos. 8,047,613, 9,327,835, 7,871,039, 7,954,762, 8,016,361, 8,336,965, 8,020,936 and 8,596,723, the entire contents of each being expressly incorporated hereinto by reference. However, a passenger-driven approach that addresses the variety of human shapes and behaviors is still lacking in conventional seat designs and implementations.

It would therefore be highly desirable if vehicle passenger seats were provided that are both comfortable to the passenger yet are lightweight. It is towards providing such improvements to passenger seats that the embodiments disclosed herein are directed.

SUMMARY

The embodiments disclosed herein are directed toward lightweight passenger seats that are especially adapted for use in aircraft cabins. The lightweight passenger seats according to the embodiments disclosed herein include several features which contribute to being both lightweight and comfortable. For example, a backrest profile designed around the users may be provided so as to enable maximum movement even for high density configurations (e.g., 28" pitch or similar).

Certain embodiments will include a backrest system having a lightweight flexible composite frame that provides the backrest with the capability to be reclined within the range of e.g., up to about 5 degrees in a fixed backrest structure with the benefit of reclining mechanical devices and their associated weight being omitted.

A support system for supporting the back regions (thoracic and lumbar) of the passenger by use of a high performance fabric (e.g., a 3D knit mesh) or alternatively foam, air blade or combinations thereof that allow for air circulation and adapts to different body profiles and shapes so as to comfortably support the body profiles in different postures and enable a balance to be achieved between comfort, weight and maintenance.

A light weight seat bottom comfort system; that supports passenger weight in a suspended manner and generally comprises (i) a support basin shaped as a hollow structure formed from lightweight engineering materials such as composites, aluminum, high performance plastics, magnesium or the like, (ii) a set of two or more opposing anchoring devices installed at least at two opposite sides of the support basin, (iii) a support member formed of a set of one or more webbings running across the basin structure which are designed to withstand passenger weight distribution throughout the seating surface which may, for example, be a fabric composed of flexible textiles, or alternatively foam, air blade or a combination thereof that provide a modularity option and enables a balance between conform, weight and maintenance, and (iv) a layer of upholstery on top of the support member to provide a comfortable touch and a better distribution of pressure throughout the seating surface.

A light weight rigid support structure formed of light weight engineering materials such as aluminum, magnesium, composites or the like, that comprises interconnected beams that present various sections and are optimized in a way to present good structural performance for use both in static and crashworthiness conditions.

The seats according to certain embodiments may include an optional headrest. The headrest may be comprised of a rigid outer shell made out of composite material, plastic material, metallic material or the like and a head support system made out of flexible material such as foam, gel or air bladders or a suspended fabric that runs across that rigid outer shell and is fixed to the perimeter of such rigid shell above mentioned. An optional layer of upholstery that finishes the surface that will be in contact with the head of the passenger.

Armrests may be provided which are formed of a rigid structure made of lightweight engineering material according to e.g., machining, casting, 3D printing, injection moulding and the like. The armrests are preferably pivotal about a rotational axis to allow pivotal folding of the armrest upwards and downwards according to the passenger's preference and to make egress and circulation easier. A layer of upholstery material may be applied on top of the rigid armrest structure to provide comfort to the passenger when the armrest is in use.

The lightweight seat assembly according to the embodiments disclosed herein thereby present a different solution to vehicle passengers as compared to those in the art, because its features maximize passenger comfort under tight spaces that may be imposed by airlines when adopting a high density cabin configuration. In addition, the seat assembly according to the embodiments disclosed herein accommodates larger and smaller users, adapts to different profiles; allows for backrest movement without a reclining mechanism and its associated weight; allows for thermo comfort, and allows for better load distributions in backrest and bottom seat areas thereby minimizing fatigue. The seat assembly disclosed herein also presents a low number of parts, when compared to state of the art, due to its relatively simple construction.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which.

DETAILED DESCRIPTION

Figure 1:
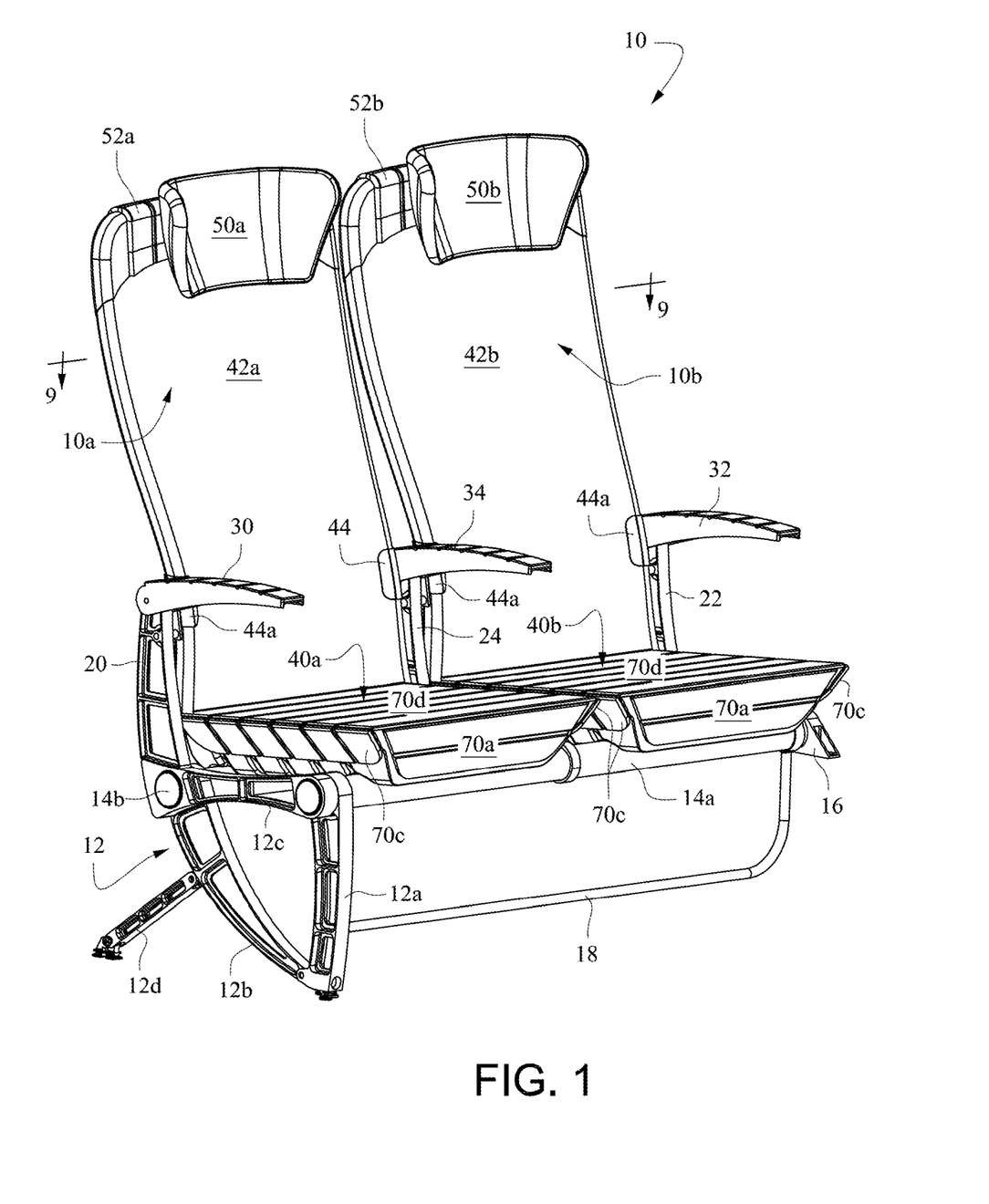
FIG. 1 is a perspective view from the front of a seat assembly in accordance with an embodiment of the invention described herein.
Figure 2:
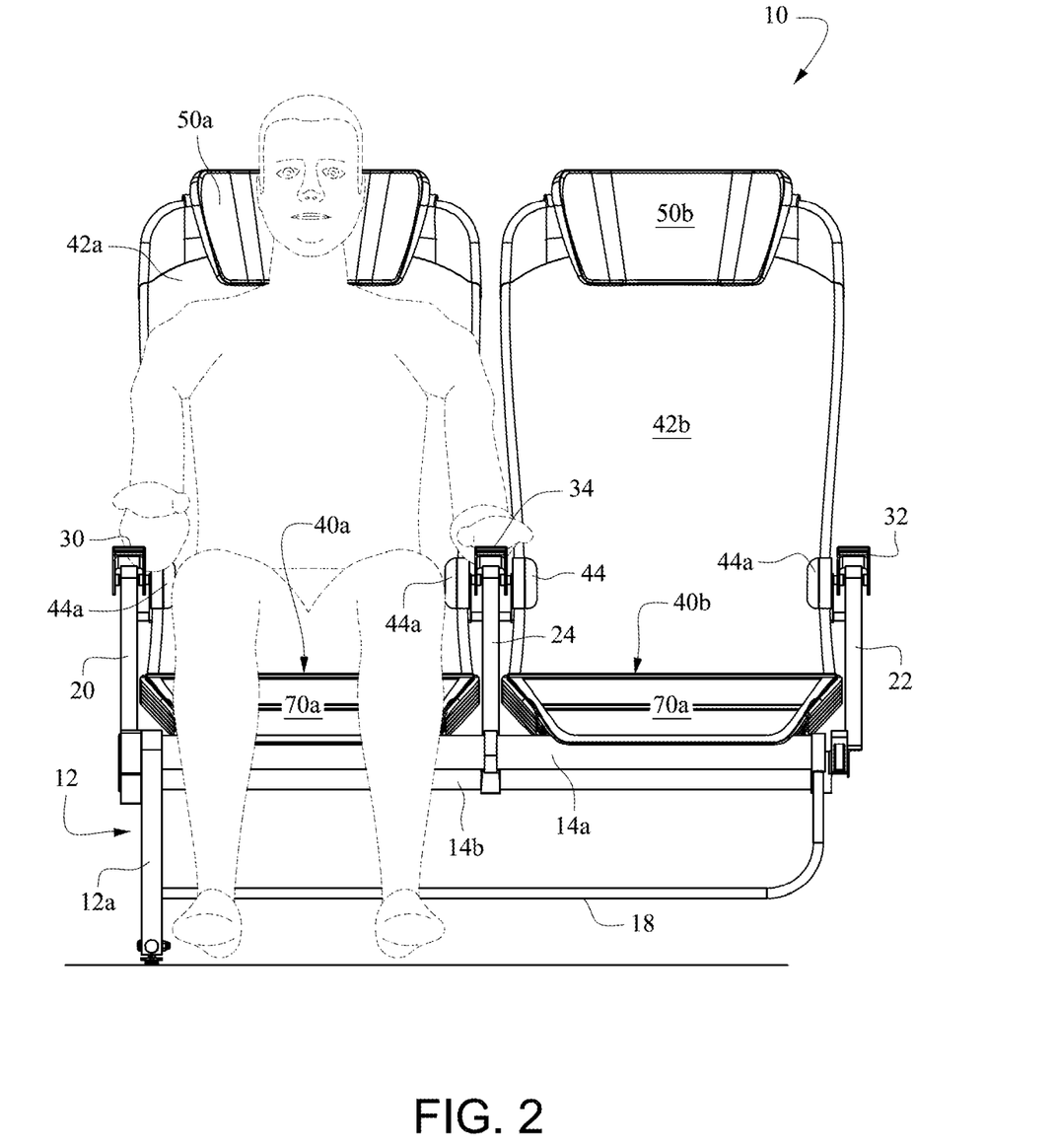
FIG. 2 is a front elevational view of a seat assembly depicted in FIG. 1 with a schematic representation of a passenger occupying one of the seats.
Figure 3:
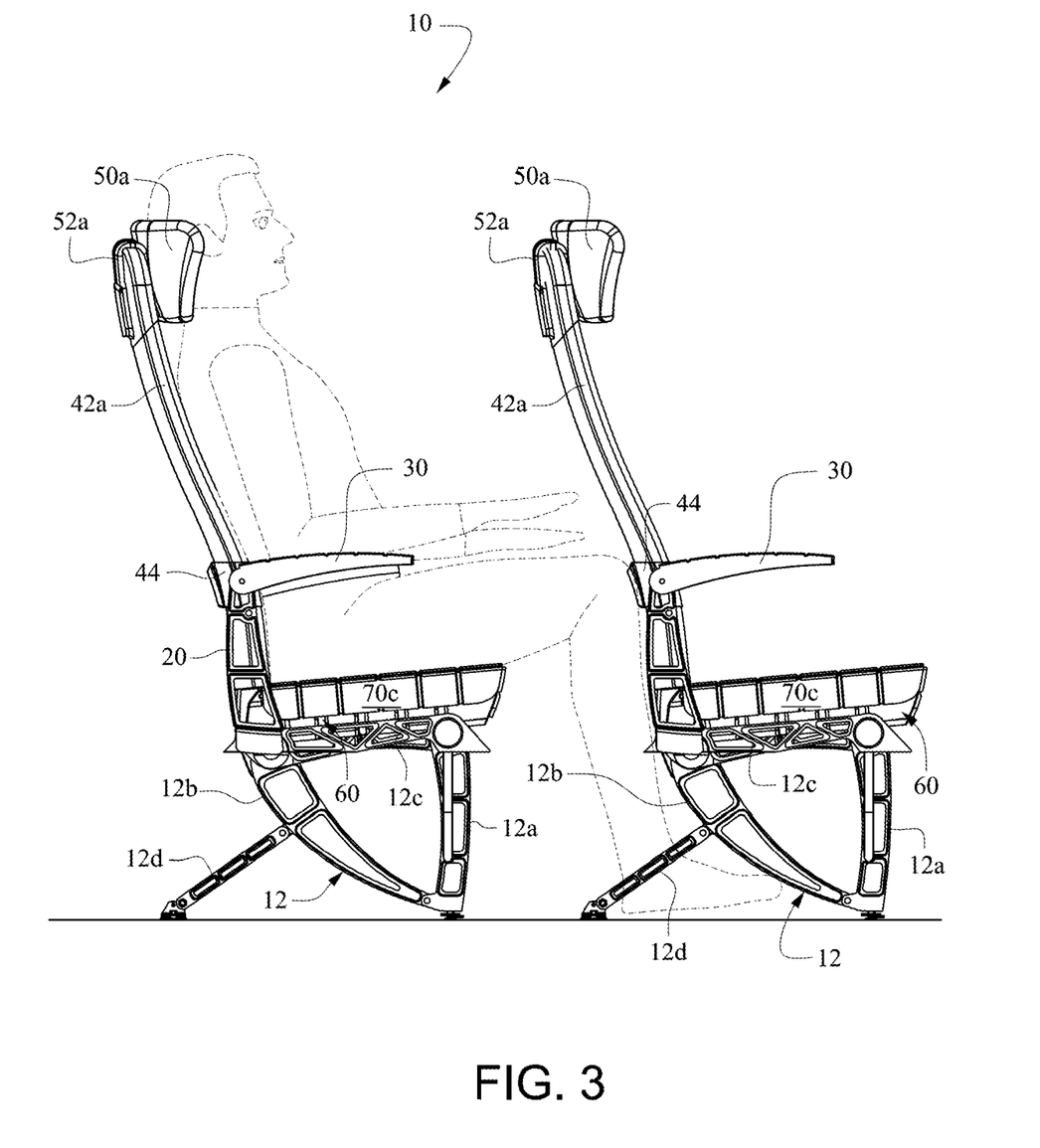
FIG. 3 is side elevational view of the seat assembly depicted in FIG. 2 showing the spatial relationship with another similar seat assembly positioned in front at a nominal 28" seat pitch.
Figure 4:
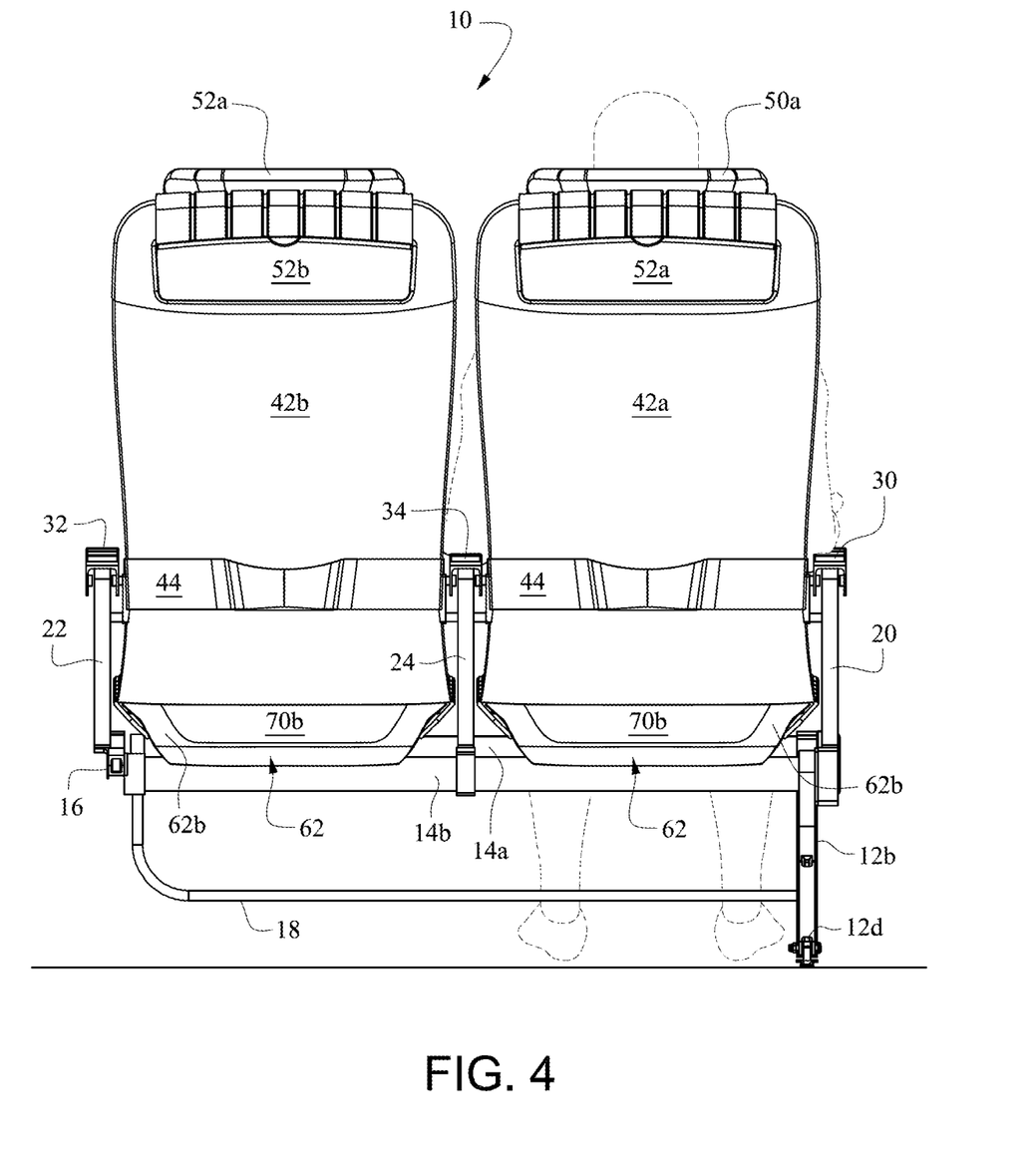
FIG. 4 is a rear elevational view of the seat arrangement depicted in FIG. 3.
Figure 5:
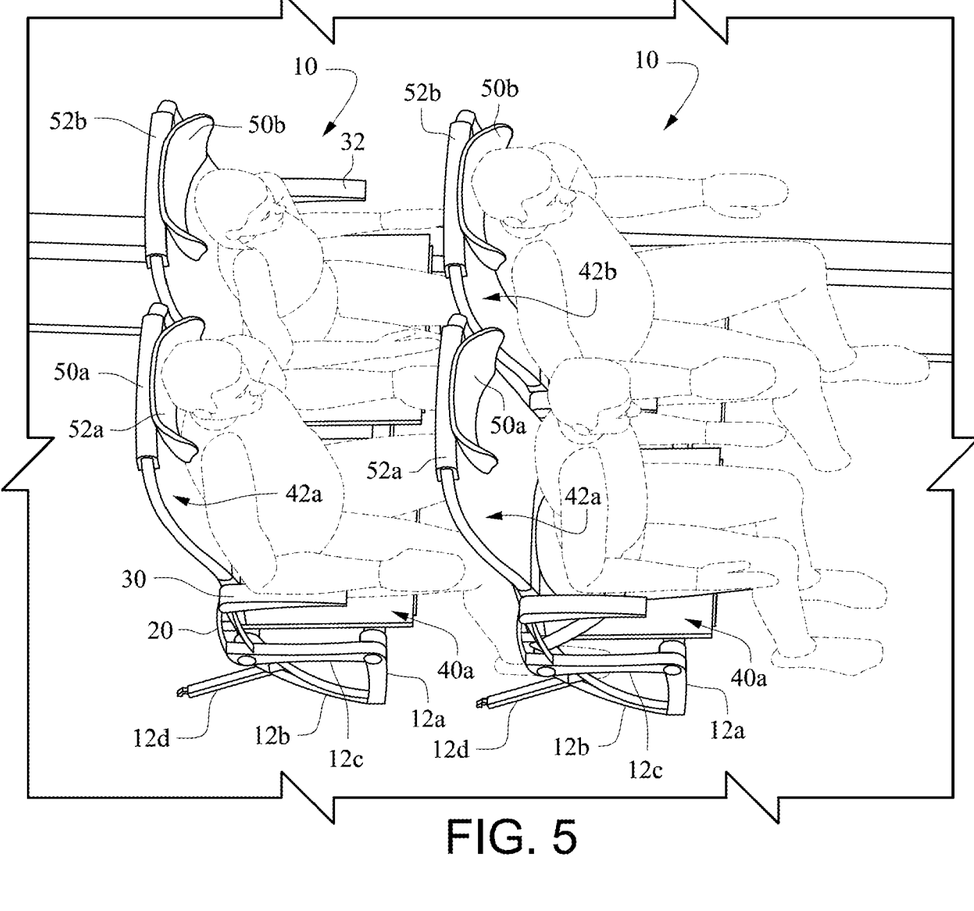
FIG. 5 is a top perspective view of the fore and aft seat arrangement depicted in FIG. 3 showing a representative passenger in each seat.
Figure 6A:
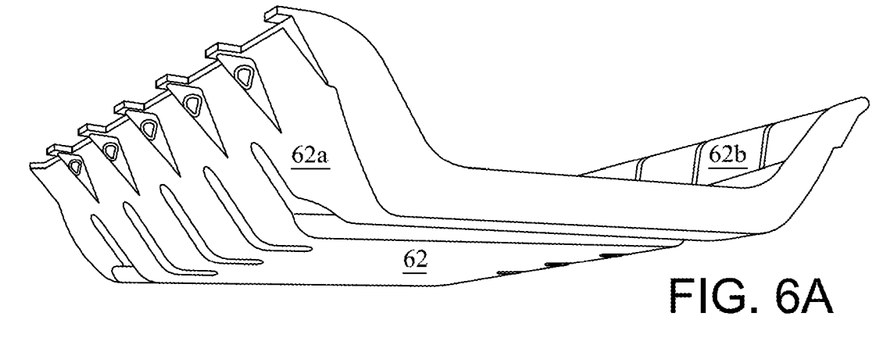
FIGS. 6A-6C show the components of the seat bottom employed in the seat assemblies disclosed herein.
Figure 6B:
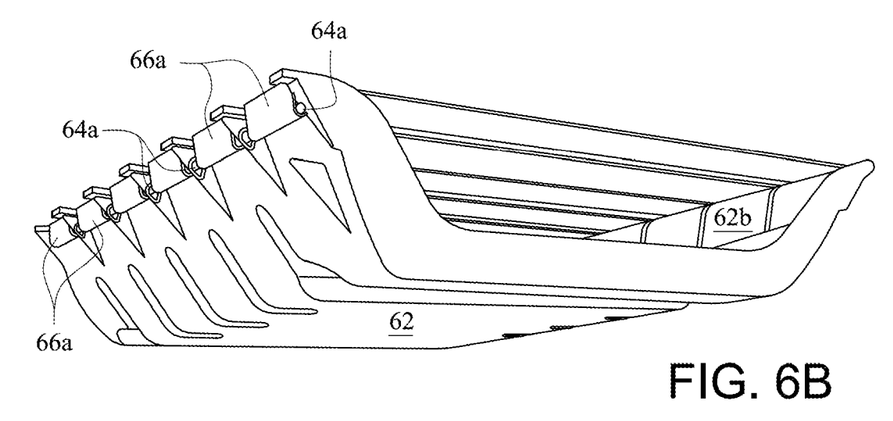
Figure 6C:
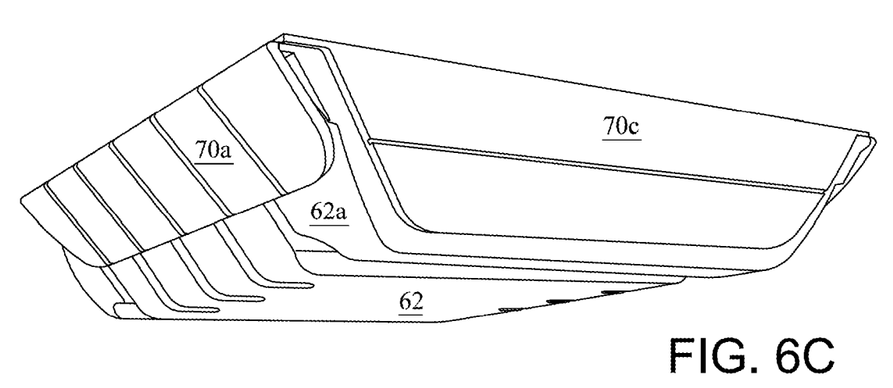
Figure 7:
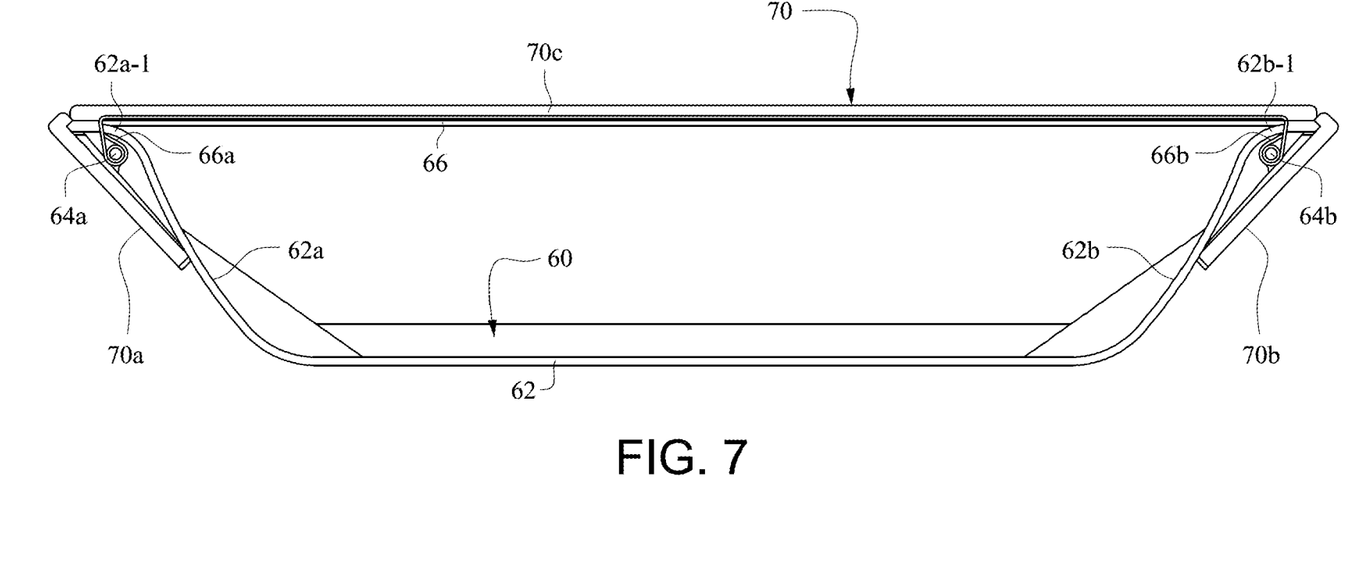
FIG. 7 is a cross-sectional elevational view of the seat bottom employed in the seat assemblies disclosed herein.
Figure 8:
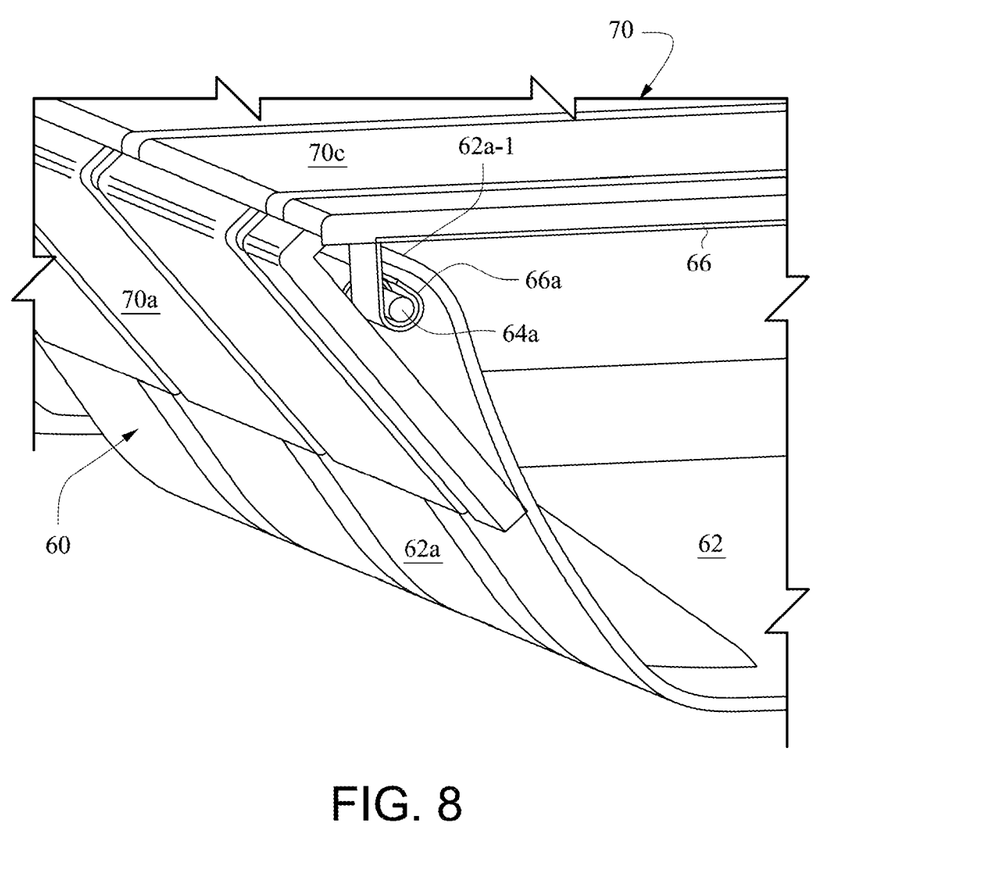
FIG. 8 is a detailed perspective cross-sectional view of the seat bottom construction employed in the seat assemblies disclosed herein.

Accompanying FIG. 1 shows a two-passenger seat assembly 10 in accordance with an embodiment of the invention disclosed herein. In this regard, the seat assembly 10 is depicted as being positioned on the port side of an aircraft cabin. A seat assembly which may be positioned on the starboard side of the aircraft cabin will thus be a mirror image of the assembly 10 depicted. Moreover, the seat assembly in accordance with the invention may also be embodied in a single, triple or more passenger seat arrangement if desired.

As shown in FIGS. 1-5, the seat assembly 10 includes an in inboard supporting base 12 comprised of an upright front support leg 12a, an arcuate rear support 12b which has a lower end connected to the lower end of the front support leg and a cross-support 12c spanning the distance between the upper ends of the front support leg 12a and the rear support 12b. A rear leg 12d has an upper end connected to an intermediate position of the arcuate support 12b and extends rearwardly therefrom to allow for rigid connection to floor structure.

Forward and rearward substantially horizontal support tubes 14a, 14b extend laterally from the corner junctures of the front and rear supports 12a, 12b with each end of the cross-support 12c, respectively, and are rigidly connected to an intermediate upright support member 24 and an outboard support member 16 that may be joined to structures associated with the passenger cabin (not shown). A baggage guard 18 may be provided so as to extend below the forward support tube 14a from the forward support leg 12a to the support member 16.

An inboard upright support member 20 has a lower end connected to the corner juncture between the rear support 12b and the rear end of the cross-support 12c and extends upwardly therefrom. Similarly an outboard upright support member 22 is connected rigidly to a rear end of the inboard support member 16. Respective arm rests 30, 32 and 34 have a rear end pivotally connected to the upper end of the upper support members 20, 22 and 24, respectively, and extend outwardly therefrom in a cantilevered manner. The arm rests may thus be deployed from an upright stowed position to a lowered position as shown, e.g., in FIG. 1.

The seat assembly 10 includes a pair of adjacent seats 10a, 10b each comprised of a seat bottom 40a, 40b and a seat back 42a, 42b, respectively. Each of the seat bottoms 40a, 40b is connected to the horizontal support tubes 14a, 14b. A knee protector band 44 is provided with opposed terminal ends formed into generally U-shaped mounting clips 44a. The mounting clips 44a are connected to each of the lateral sides of the seat backs 42a, 42b in the lumbar region thereof and connected to each upright support member 20, 22 and 24. The U-shaped mounting clips 44a are therefore sized and configured to partially surround a portion of the upright tubular back frame 80 (see FIG. 9) in adjacent the lumbar region of the seat backs 42a, 42b. This interconnection between the knee protector band 44 at the lumbar region of the seat backs 42a, 42b allows the lower portion thereof to remain positionally fixed but allow the upper portion to be flexed rearwardly (e.g., as depicted by the dashed line and arrow in FIG. 3) without the need for reclining mechanisms and their associated weight.

Concave head rest assemblies 50a, 50b are attached to respective U-shaped mounting brackets 52a, 52b for removable mounting to the uppermost ends of the seat backs 42a, 42b. The head rest assemblies 50a, 50b may be provided with internal material and/or structures which allow the passenger to manipulate the concavity and/or inclination thereof to allow for more comfortable fit. The head rest assemblies 50a, 50b may also be adjustable vertically between raised and lowered positions so as to accommodate different passenger height requirements.

The component structures associated with each of the seat bottoms 40a, 40b are depicted in greater detail in accompanying FIGS. 6A-6C and FIGS. 7-8. In this regard, the discussion below in connection with such Figures will be with respect to seat bottom 40a, but it will be understood that such discussion is equally applicable to the structures associated with seat bottom 40b.

The seat bottom 40a includes a recessed basin 60 having a bottom wall 62 and opposed front and rear walls 62a, 62b joined to the bottom wall 62 and upwardly and outwardly extending therefrom. Each of the front and rear walls 62a, 62b thus terminates in respective transversely extending upper edges 62a-1, 62b-1, respectively. The walls 62, 62a and 62b of the recessed basin 62 are preferably integral (unitary) with one another and formed of a lightweight material, e.g., a lightweight fiber-reinforced plastics material and/or lightweight metal (e.g., aluminum) alloy. The bottom wall 62 of the basin 60 thus forms a recessed interior region between the opposed end walls 62a, 62b thereof.

Front and rear support rods 64a, 64b are positioned transversely parallel to the upper edges 62a-1, 62b-1 of the end walls 62a, 62b, respectively. Each of the support rods 64a, 64b is inserted into the end eyelets 66a, 66b, respectively, of a plurality of laterally spaced-apart support straps 66 extending tautly under tension between the rods 64a, 64b over the recessed central region of the bottom wall 62 of the basin 60.

A relatively thin fabric cushion 70 is positioned over the support straps 66. The fabric cushion 70 includes front and rear flap regions 70a, 70b and lateral flap regions 70c each being joined to a central cushion region 70d. The front and rear flap regions 70a, 70b cover the terminal ends of the straps 66 while the opposed flap regions 70c extend over the lateral sides of the basin 60 so as to cover lateral access to the interior recessed central region thereof. The central seat region 70c is positioned over the straps 66 and above the recessed central region of the bottom wall 62. The fabric cushion 70 may be removably connected to the basin 60 by any suitable connection devices, e.g., snap assemblies, hook assemblies, and fabric hook-and-pile connectors (e.g., VELCRO® fasteners) so as to positionally restrain the cushion 70 on the basin 60.

Figure 9:
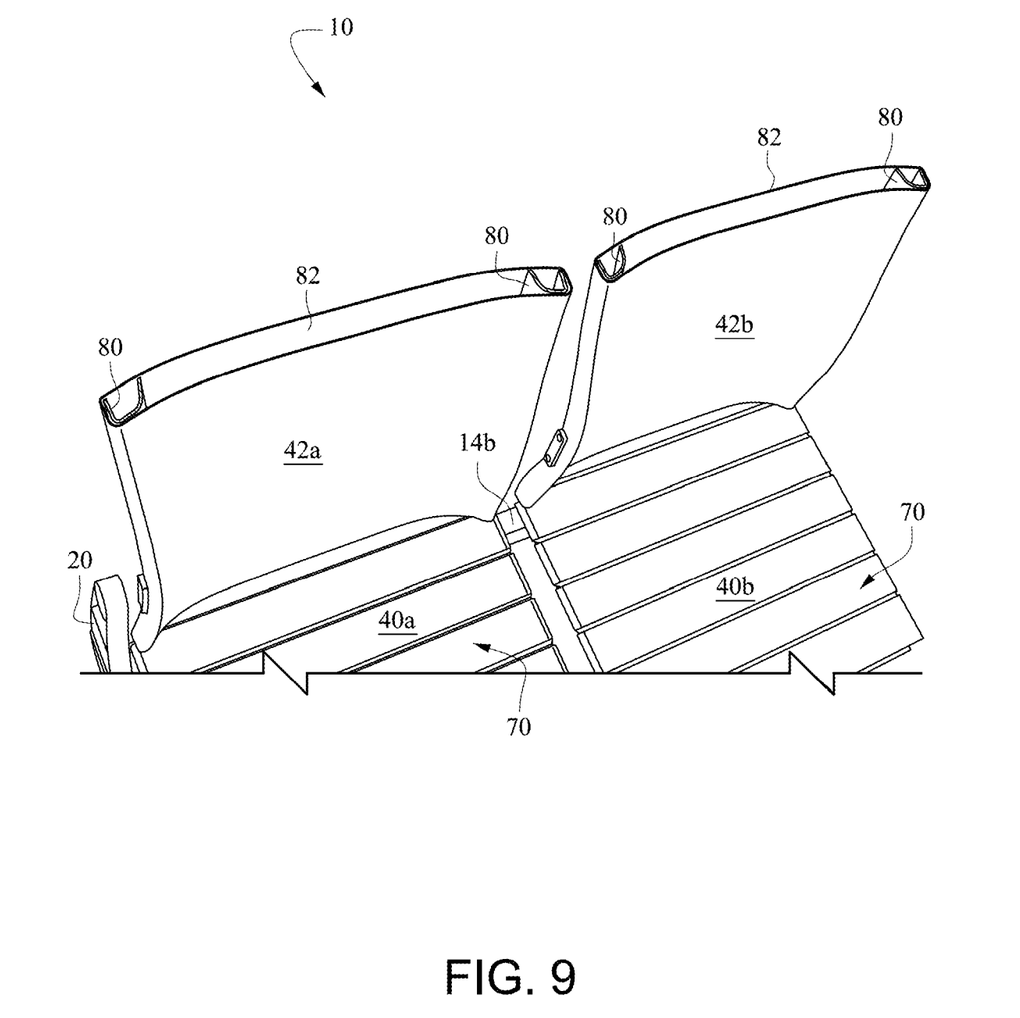
FIG. 9 is a cross-sectional view of the seat backs of the seat assembly depicted in FIG. 1 as taken along line 9-9 therein in which some structure has been omitted (e.g., the arm rests) for clarity of presentation.

As is shown in FIG. 9, each of the seat backs 42a, 42b is most preferably formed of an inverted U-shaped tubular back frame 80 and a fabric sleeve 82 positioned over the back frame 80. The fabric sleeve 82 is sized and configured so as to be held under tension laterally between the upright members of the back frame 80 so as to present a taut surface against which the passenger back may rest. The back frame 80 is formed of a lightweight tubular material, e.g., a composite material, a lightweight fiber-reinforced plastics material and/or lightweight metal (e.g., aluminum) alloy.

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A vehicle passenger seat comprising:
   a seat back; and
   a seat bottom, wherein the seat bottom comprises:
   (i) a basin having a bottom wall and opposed forward and rearward end walls extending upwardly from the bottom wall to define therebetween a recessed central interior space;
   (ii) a plurality of straps having opposed ends connected to respective upper edge regions of the forward and rearward end walls so as to be positioned under tension over the recessed central interior space; and
   (iii) a cover cushion covering the straps, wherein the cover cushion includes opposed side flaps and front and rear flaps each being connected to the basin.

2. The vehicle passenger seat according to claim 1, further comprising forward and rearward support rods each positioned parallel to a respective one of the upper edge regions of the forward and rearward end walls of the basin, wherein the straps include eyelets at terminal ends thereof for receiving the support rod to thereby mount the straps to the basin under tension.

3. The vehicle passenger seat according to claim 1, further comprising a support base for supporting the seat back and seat bottom, the support base comprising an upright front support leg having upper and lower ends and an arcuate rear support having upper and lower ends, wherein the lower end of the front support leg is connected to the lower end of the arcuate rear support.

4. The vehicle passenger seat according to claim 3, wherein the support base comprises a cross-support spanning a distance between and interconnecting the upper ends of the front support leg and the arcuate rear support.

5. The vehicle passenger seat according to claim 4, further comprising forward and rearward substantially horizontal support tubes each extending laterally from respective interconnected upper ends of the front support leg and the arcuate rear support.

6. The vehicle passenger seat according to claim 3, wherein the support base further comprises a rear leg connected to and rearwardly extending from the arcuate rear support.

7. The vehicle passenger seat according to claim 1, further comprising a knee protector band connected to opposite lateral sides of the seat back adjacent a lumbar support region thereof.

8. The vehicle passenger seat according to claim 1, wherein the seat back comprises a generally inverted U-shaped tubular seat back frame, and a fabric sleeve tautly covering the seat back frame.

9. The vehicle passenger seat according to claim 8, wherein the seat back frame allows an upper region of the seat back above a lumbar support region thereof to be resiliently flexed between upright and rearwardly inclined positions.

10. The vehicle passenger seat according to claim 9, further comprising a knee protector band which includes terminal ends formed into U-shaped mounting clips which partially surround the seat back frame at opposite lateral sides thereof adjacent the lumbar support region.

11. The vehicle passenger seat according to claim 1, further comprising a head rest removably attached to an upper end of the seat back.

12. An aircraft which comprises a passenger cabin and at least one vehicle passenger seat according to claim 1 positioned within the passenger cabin.

13. A vehicle passenger seat comprising:
a seat back having a lumbar support region and an upper region above the lumbar support region which is capable of being resiliently flexed between upright and rearwardly inclined positions;
a seat bottom,
a support base supporting the seat back and seat bottom,
a pair upright support members connected to the support base and extending upwardly adjacent a respective lateral side of the seat back,
a pair of generally U-shaped mounting clips which respectively interconnect the upright support members to the seat back at opposed sides thereof adjacent the lumbar region of the seat back.

14. The vehicle passenger seat according to claim 13, wherein the support base comprises an upright front support leg having upper and lower ends and an arcuate rear support having upper and lower ends, wherein the lower end of the front support leg is connected to the lower end of the arcuate rear support.

15. The vehicle passenger seat according to claim 13, wherein the support base comprises a cross-support spanning a distance between and interconnecting the upper ends of the front support leg and the arcuate rear support.

16. The vehicle passenger seat according to claim 15, further comprising forward and rearward substantially horizontal support tubes each extending laterally from respective interconnected upper ends of the front support leg and the arcuate rear support.

17. The vehicle passenger seat according to claim 13, wherein the support base further comprises a rear leg connected to and rearwardly extending from the arcuate rear support.

18. The vehicle passenger seat according to claim 17, wherein the seat back comprises a generally inverted U-shaped tubular seat back frame, and a fabric sleeve tautly covering the seat back frame.

19. The vehicle passenger seat according to claim 13, further comprising a head rest removably attached to an upper end of the seat back.

20. An aircraft which comprises a passenger cabin and at least one vehicle passenger seat according to claim 13 positioned within the passenger cabin.

21. A vehicle passenger seat comprising:
a seat back; and
a seat bottom,
a support base for supporting the seat back and seat bottom, the support base comprising an upright front support leg having upper and lower ends and an arcuate rear support having upper and lower ends, wherein the lower end of the front support leg is connected to the lower end of the arcuate rear support, wherein the support base comprises a cross-support spanning a distance between and interconnecting the upper ends of the front support leg and the arcuate rear support, and wherein
the seat bottom comprises:
(i) a basin having a bottom wall and opposed forward and rearward end walls extending upwardly from the bottom wall to define therebetween a recessed central interior space;
(ii) a plurality of straps having opposed ends connected to respective upper edge regions of the forward and rearward end walls so as to be positioned under tension over the recessed central interior space; and
(iii) a cover cushion covering the straps and connected to the basin.

22. The vehicle passenger seat according to claim 21, further comprising forward and rearward support rods each positioned parallel to a respective one of the upper edge regions of the forward and rearward end walls of the basin, wherein the straps include eyelets at terminal ends thereof for receiving the support rod to thereby mount the straps to the basin under tension.

23. The vehicle passenger seat according to claim 21, wherein the cover cushion includes opposed side flaps and front and rear flaps each being connected to the basin.

24. The vehicle passenger seat according to claim 21, further comprising forward and rearward substantially horizontal support tubes each extending laterally from respective interconnected upper ends of the front support leg and the arcuate rear support.

25. The vehicle passenger seat according to claim 21, wherein the support base further comprises a rear leg connected to and rearwardly extending from the arcuate rear support.

26. The vehicle passenger seat according to claim 21, further comprising a knee protector band connected to opposite lateral sides of the seat back adjacent a lumbar support region thereof.

27. The vehicle passenger seat according to claim 21, wherein the seat back comprises a generally inverted U-shaped tubular seat back frame, and a fabric sleeve tautly covering the seat back frame.

28. The vehicle passenger seat according to claim 27, wherein the seat back frame allows an upper region of the seat back above a lumbar support region thereof to be resiliently flexed between upright and rearwardly inclined positions.

29. The vehicle passenger seat according to claim 28, further comprising a knee protector band which includes terminal ends formed into U-shaped mounting clips which partially surround the seat back frame at opposite lateral sides thereof adjacent the lumbar support region.

30. The vehicle passenger seat according to claim 21, further comprising a head rest removably attached to an upper end of the seat back.

31. An aircraft which comprises a passenger cabin and at least one vehicle passenger seat according to claim 21 positioned within the passenger cabin.

* * * * *